(12) United States Patent
Rastogi et al.

(10) Patent No.: US 8,260,070 B1
(45) Date of Patent: Sep. 4, 2012

(54) METHOD AND SYSTEM TO GENERATE A COMPRESSED IMAGE UTILIZING CUSTOM PROBABILITY TABLES

(75) Inventors: Anubha Rastogi, Nodia (IN); Balaji Krishnamurthy, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 981 days.

(21) Appl. No.: 11/543,708

(22) Filed: Oct. 3, 2006

(51) Int. Cl.
*G06K 9/36* (2006.01)
(52) U.S. Cl. .................. 382/239; 382/232; 382/246
(58) Field of Classification Search .................. 382/232, 382/239, 246
See application file for complete search history.

(56) References Cited

U.S. PATENT DOCUMENTS

| | | | | |
|---|---|---|---|---|
| 4,922,915 | A * | 5/1990 | Arnold et al. | 382/128 |
| 5,835,034 | A * | 11/1998 | Seroussi et al. | 341/65 |
| 5,923,783 | A * | 7/1999 | Kawauchi et al. | 382/233 |
| 5,956,430 | A * | 9/1999 | Kunitake et al. | 382/246 |
| 6,373,412 | B1 | 4/2002 | Mitchell et al. | |
| 6,643,402 | B1 * | 11/2003 | Okada | 382/232 |
| 6,700,513 | B2 | 3/2004 | McGuire | |
| 6,798,365 | B2 | 9/2004 | Kim et al. | |
| 6,993,184 | B2 * | 1/2006 | Matsugu | 382/173 |
| 7,006,663 | B2 * | 2/2006 | Acharya et al. | 382/100 |
| 7,043,086 | B2 | 5/2006 | Rijavec et al. | |
| 7,058,229 | B2 | 6/2006 | Wang et al. | |
| 7,289,654 | B2 * | 10/2007 | Muller et al. | 382/132 |
| 2002/0001394 | A1 * | 1/2002 | Taniguchi et al. | 382/100 |
| 2002/0044691 | A1 * | 4/2002 | Matsugu | 382/218 |
| 2002/0063795 | A1 * | 5/2002 | Kokubo et al. | 348/473 |
| 2002/0080246 | A1 * | 6/2002 | Parulski | 348/225 |
| 2003/0016853 | A1 * | 1/2003 | Oosawa | 382/132 |
| 2004/0066970 | A1 * | 4/2004 | Matsugu | 382/217 |
| 2004/0066973 | A1 * | 4/2004 | Prakash et al. | 382/239 |
| 2005/0117789 | A1 * | 6/2005 | Kim et al. | 382/128 |
| 2005/0216262 | A1 * | 9/2005 | Fejzo | 704/217 |
| 2006/0013497 | A1 | 1/2006 | Yang et al. | |
| 2006/0133684 | A1 * | 6/2006 | Srinivasan et al. | 382/250 |
| 2007/0065030 | A1 * | 3/2007 | Shen et al. | 382/238 |
| 2007/0162896 | A1 * | 7/2007 | Geva et al. | 717/130 |
| 2008/0130903 | A1 * | 6/2008 | Ojanpera | 381/2 |

OTHER PUBLICATIONS

Ashwin Satyanrayana et al, "A Dynamic Adaptive Sampling Algorithm for Real World Applications: Fingerprint and Face Recognition", May 2, 2005, Springer Berlin, vol. 3488 pp. 631-640.*
Jeon et al, "Huffman coding of DCT coefficients using dynamic codeword assignment and adaptive codebook selection", Signal Processing: Image Communication 12 (1998) 253-262.*
Crouse, M., "JPEG optimization using an entropy-constrained quantization framework", *IEEE Proceedings Data Compression Conference*, 1995. DCC '95., (1995),342-351.
Muller, Rickus, "Image compression techniques with specific focus on weighted finite automata", Thesis, University of Stellenbosch,(2005),122 pgs.
Ratakonda, K., "Lossless image compression with multiscale segmentation", *IEEE Transactions on Image Processing*, 11(11), (Nov. 2002),1228-1237.

* cited by examiner

*Primary Examiner* — Chan S Park
*Assistant Examiner* — Avinash J Yentrapati
(74) *Attorney, Agent, or Firm* — Schwegman, Lundberg & Woessner, P.A.

(57) ABSTRACT

An optimized method and system to generate a compressed image utilizing custom probability tables are described. The system may include a input module to receive a digital image, a sample generator to generate a representative sample image from the input image, a custom probability tables generator to generate custom probability tables and an entropy coder to encode the input image utilizing the custom probability tables. The custom probability tables generator may be configured to generate custom probability tables utilizing the representative sample image.

21 Claims, 6 Drawing Sheets

METHOD AND SYSTEM TO GENERATE A COMPRESSED IMAGE UTILIZING CUSTOM PROBABILITY TABLES

TECHNICAL FIELD

This application relates to JPEG compression and, in particular, to a method and system to generate a compressed image utilizing custom probability tables.

BACKGROUND

Digital images are commonly used in several applications such as, for example, in digital still cameras (DSC). A digital image includes a matrix of elements, commonly referred to as a bit map. Each element of the matrix, which represents an elemental area of the image (a pixel or pel), is formed by several digital values indicating corresponding components of the pixel. Digital images are typically subjected to a compression process to increase the number of digital images which can be stored simultaneously, such as onto a memory of the camera. Moreover, this allows transmission of digital images to be easier and less time consuming. A compression method commonly used in standard applications is the JPEG (Joint Photographic Experts Group) algorithm, described in CCITT T.81, 1992.

In a basic JPEG algorithm, 8×8 pixel blocks are extracted from the digital image. Discrete Cosine Transform (DCT) coefficients are then calculated for the components of each block. The DCT coefficients are rounded off using corresponding quantization tables. The quantized DCT coefficients may be entropy coded utilizing probability tables to obtain a compressed digital image. Entropy coding may be performed by using Arithmetic encoding or by using Huffman coding. The original digital image may be extracted later from the compressed version of the image by a decompression process.

BRIEF DESCRIPTION OF DRAWINGS

Embodiments are illustrated by way of example and not limitation in the figures of the accompanying drawings, in which like references indicate similar elements and in which.

DETAILED DESCRIPTION

Entropy coding may be performed utilizing predefined probability tables or custom probability tables generated for the particular image. Custom probability tables may be generated by collecting statistics of the DCT coefficients and the zero run lengths in a separate pass over the DC transformed image.

The compression achieved utilizing predefined probability tables may not be optimal, because the statistics of the particular image to be encoded may be different from the statistics that have been used to create the predefined probability tables. For example, the resulting compressed image file may be larger than optimal in size.

In a case where entropy coding is performed utilizing custom probability tables generated for the particular image, the statistics for the entire DCT image may need to be collected in a separate pass. The entropy codes for the DCT coefficients may be generated in a separate pass. The resulting compressed image file may be closer to optimal size than a compressed image generated utilizing predefined probability tables. However, this method may require increased resources. For example, method utilizing a customized probability tables may require increased amount of memory in order to store the DCT coefficients that have been computed during the DCT operation. Alternatively, where not all of the DCT coefficients are being stored, those DCT coefficients that are not stored may need to be recomputed, which may result in the increased usage of the computational resources.

A method and system are provided to generate a compressed version of an input image utilizing custom probability tables. In one example embodiment, in order to generate custom probability tables, a sample of the image may be obtained first, and the custom probability tables may be generated based on the sample. A sampling process may be selected such that the sample is representative of the entire image and thus may be considered a good proxy for the actual image. Some of the sampling methods may include random sampling and sampling according to a fixed rule, as will be discussed below.

In one example embodiment, the sampling may be iteratively refined, e.g., starting with selecting a current sample being a small percentage portion of the entire input image. At each iteration, the entropy of the probability distribution (or simply entropy) may be calculated for the current sample. The iterative process may be completed when the calculated entropy for the consecutive samples starts to converge. The resulting sample may be identified as suitably representative of the entire input image and thus used for generating a custom probability tables.

The probability tables generated from the sampled fraction of the image (the sample) may be a close approximation of the probability tables generated from the complete image. Because the size of the sampled fraction of the image in less than the size of the entire image, the computation required for generating statistics for the sampled fraction of the image and for encoding of the DCT coefficients representing the sampled fraction of the image may be less than the computation required for performing the same operations for the entire image. An example system to generate a compressed version of an input image utilizing custom probability tables may be implemented, in one embodiment, in the context of an architecture illustrated in FIG. 1

Figure 1:
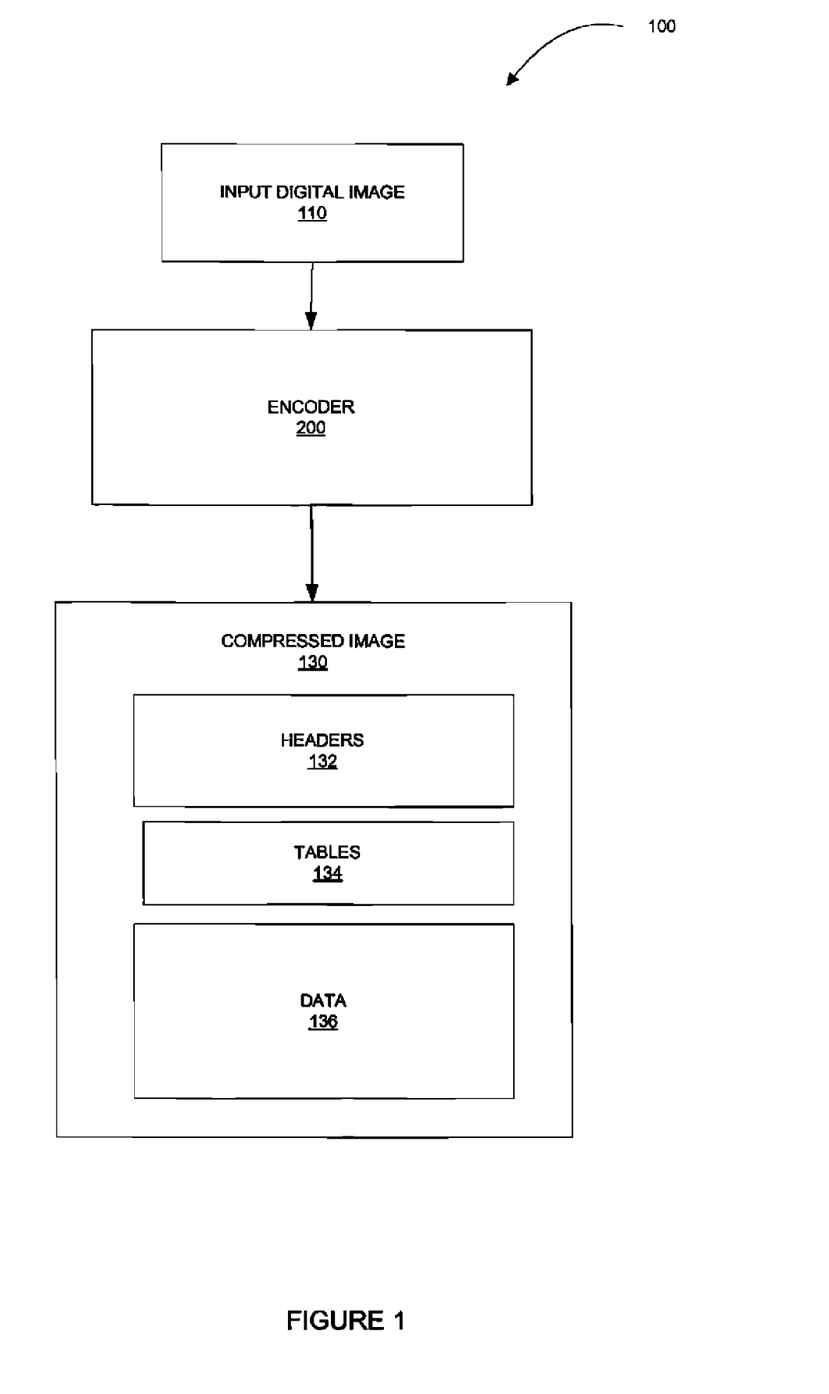
FIG. 1 is a block diagram showing an architecture within which a method and system to generate a compressed version of an image may be implemented, in accordance with an example embodiment.

FIG. 1 illustrates an example architecture 100, within which the system to improve performance during a process of entropy coding may be implemented. In the example architecture 100, an input digital image 110 is provided to an encoder 200. The encoder 200 may be configured to generate a compressed image 130, e.g., a JPEG file, which corresponds to the input digital image 110. The compressed image 130 may include headers 132, tables 134, and data 136.

The input digital image 110, in one example embodiment, may be a raw digital image or a compressed digital image. For example, a compressed input image may be a compressed image generated utilizing a technique different from the techniques described herein (e.g., utilizing pre-defined Huffman tables for JPEG compression). If the input digital image 110 is a compressed digital image, the encoder 200 may uncompress the compressed digital image to the DCT level and perform operations to generate an improved compressed image (e.g., a compressed image that is smaller in size than the original compressed digital image). One example embodiment of the encoder 200 may be described with reference to FIG. 2.

Figure 2:
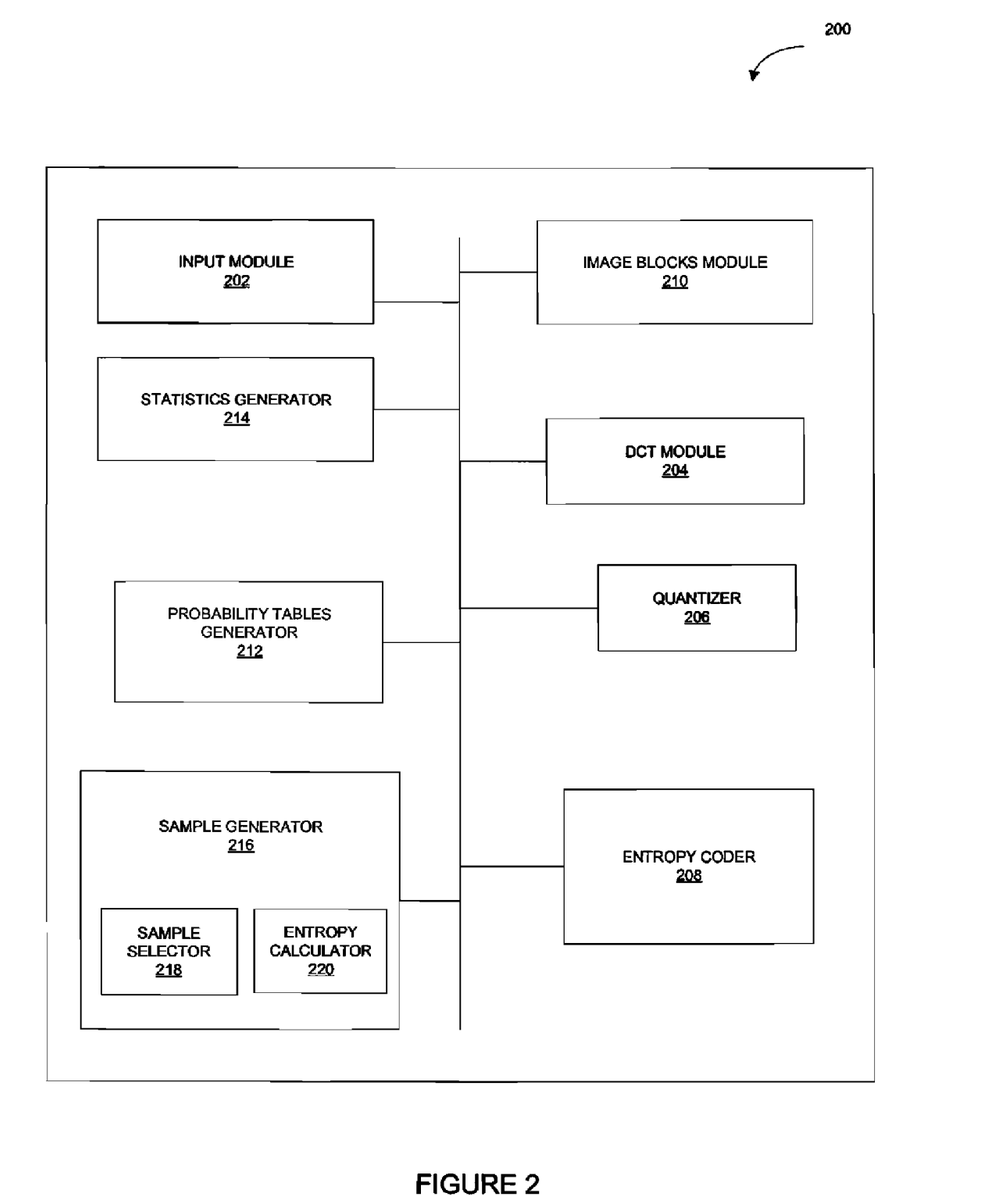
FIG. 2 is a block diagram illustrating an encoder, in accordance with an example embodiment.

FIG. 2 is a block diagram of an encoder 200, according to one example embodiment. The encoder 200 may comprise an input module 202, a DCT module 204, a quantizer 206 and an entropy coder 208.

The encoder 200 may receive image pixels, or input digital image, at an input module 202. The input module 202 may provide the input digital image data to the DCT module 204. The DCT module 204 may cooperate with an image blocks module 210 to divide the input digital image into non-overlapping, fixed length image blocks. The DCT module 204 may then transform each image block into a corresponding block of DCT coefficients. The DCT coefficients may be referred to as frequency domain coefficients, and a block of DCT coefficients may be referred to as a frequency domain image block (or a frequency domain image).

The quantizer 206 may be configured to receive the DCT coefficients generated by the DCT module 204 and to quantize the corresponding set of values utilizing quantization tables. Quantization tables may provide factors indicating how much of the image quality can be reduced for a given DCT coefficient before the image deterioration is perceptible.

The entropy coder 208 may be configured to receive the quantized DCT coefficients from the quantizer 206 and to rearrange the DCT coefficients in a zigzag order. The zigzag output is then compressed using runlength encoding. The entropy coder 208, in one example embodiment, may utilize probability tables to generate entropy codes. In one embodiment, the probability tables may be Huffman tables and the entropy codes may be Huffman codes. A probability tables generator 212 may be configured to generate two sets of probability tables for an image, one for the luminance or greyscale components and one for the chrominance or colour components.

The probability tables generator 212, in one example embodiment, may generate probability tables utilizing statistics associated with the input image provided by a statistics generator 214. As mentioned above, in one example embodiment, the probability tables generator 212 may be configured to generate custom probability tables based on such a sample of the image that is representative of the entire image and thus may be considered a good proxy for the actual image.

As shown in FIG. 2, the encoder 200 may include a sample generator 216. The sample generator 216, in one example embodiment, may comprise a sample selector 218 and an entropy calculator 218. The sample generator 216, in one example embodiment, may be configured to generate a sample of an input image that is representative of the entire image and thus may be considered a good proxy for the actual image. The sample generator 216 may utilize a variety of sampling methods, such as, for example, random sampling and sampling according to a fixed rule. One example sampling method is described below.

In order to sample p % of blocks in an image where each block has the w number of columns and the h number of rows, the sample generator 216 may be configured to skip w/p number of blocks in each row between the selected sample blocks. In order to avoid excessive sampling of the same columns in the input image, in one example embodiment, the sample generator 216 may start sampling in each row from a different column location than that was done in the previous one or more rows, all the while skipping w/p blocks between the selected sample blocks. This example technique may result in sampling each row of an image block, but not necessary sampling each column of an image block.

Some other sampling methods may include, for example, sampling every kth row of an image block, sampling every kth column of an image block or generating a grid associated with an image block and sampling the central element the grid.

In one example embodiment, the DCT module 204 may be configured to obtain DCT coefficients for a sample image generated by the sample generator 216. The statistics generator 214 may generate the statistics associated with the DCT coefficients for the sample image. The DCT module 204, or some additional module in the encoder 200, may be configured to keep track of and/or store the obtained DCT coefficients that have been calculated for the sample fragment of the input image. The entropy coder 208 may then utilize the stored DCT coefficients to generate entropy codes for the input image.

Where the sample generator 216 have been configured to utilize a fixed sampling, the entropy coder 208 may be configured to utilize the fixed rule to determine which blocks from the sample are already being held in memory for the actual encoding. In the embodiments, where a random sampling technique is employed, the encoder 200 may be configured store the indices of the sampled blocks in addition to storing the associated DCT coefficients.

In one example embodiment, the percentage of blocks to be sampled from an input image may be defined by a user. Alternatively, the sample generator 216 may be configured to utilize a default value. The default value may be determined, e.g., based on empirical data, may be used. As mentioned above, the size of the sample may be iteratively refined. The example operations performed by the encoder 200 may be described with reference to FIG. 3.

Figure 3:
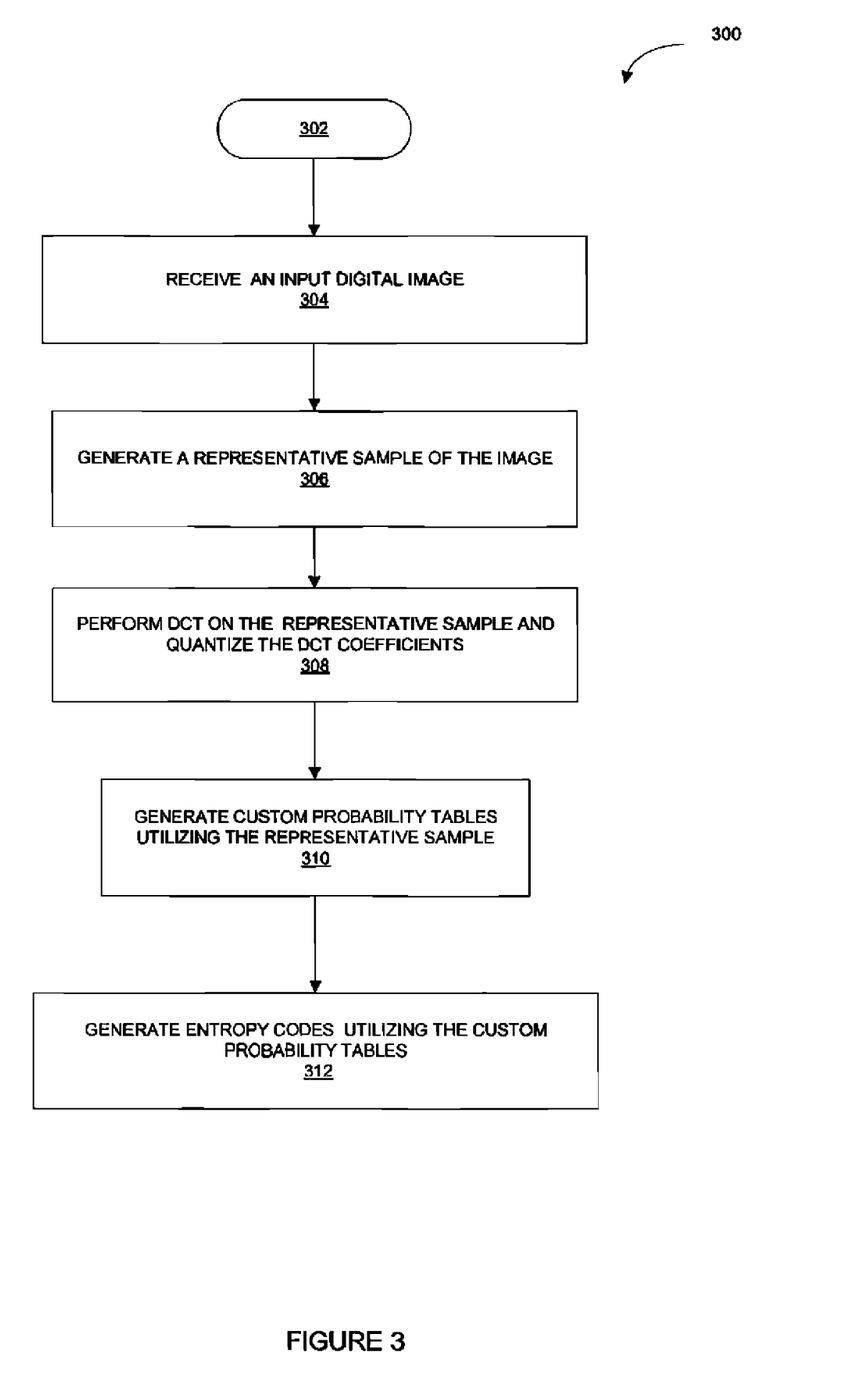
FIG. 3 is a flow chart illustrating a method to generate a compressed version of an image, in accordance with an example embodiment.

FIG. 3 is a flow chart illustrating a method 300, in accordance with an example embodiment, to generate a compressed image. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 3 described above.

Figure 5:
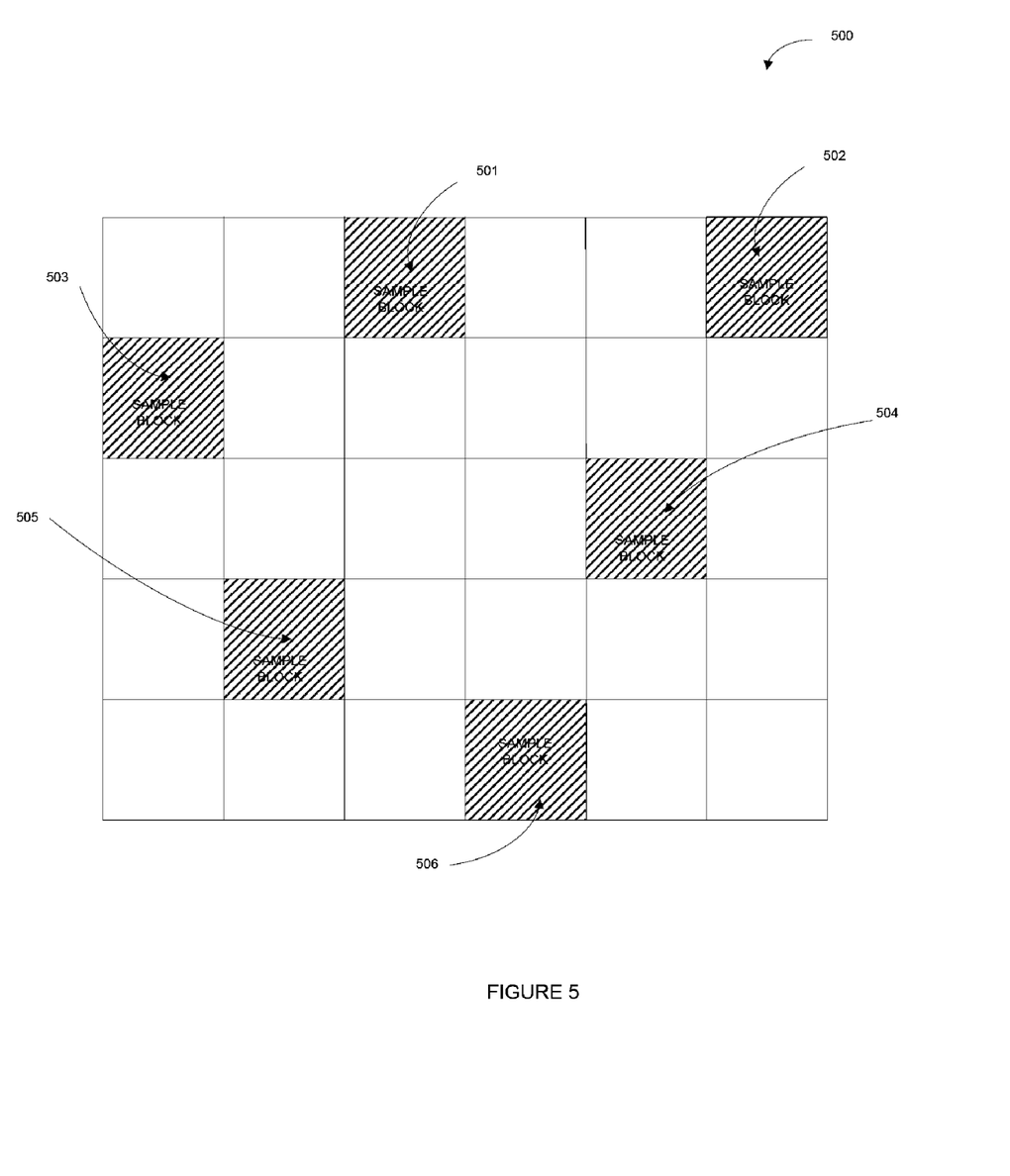
FIG. 5 illustrates an image including some selected sample blocks, in accordance with an example embodiment.

As shown in FIG. 3, the method 300 commences at operation 302. At operation 304, the sample generator 216 receives an input digital image. The sample generator 216 generates a representative sample of the digital image at operation 306. An example representation of a digital image 500 is shown in FIG. 5. An example sample of the digital image 500 may comprise blocks 501 through 506.

Returning to FIG. 3, at operation 308, the DCT module 204 generates DCT coefficients for the representative sample generated by the sample generator 216. The quantizer 206 quantizes the generated DCT coefficients.

At operation 310, the probability tables generator 212 generates custom probability tables based on the DCT coefficients associated with the representative sample image and the statistics for the DCT coefficients associated with the representative sample generated by the statistics generator 214. It will be noted, that, in one example embodiment, the generated custom probability tables may include symbols that are not found in the selected representative sample. Such symbols may be assigned the frequency value of 1. At operation 312, the entropy coder 208 generates uniquely decodable (UD) codes (e.g., Huffman codes), utilizing the custom probability table.

In one example embodiment, the memory requirement for generating a custom probability tables based on a sampled fraction of the image, as described with reference to FIG. 2 and FIG. 3, may be improved in comparison with the memory requirement for generating a custom probability table based on the entire input image. In some embodiments, a single 8×8 block of memory may be sufficient to perform the processing required to compress the input image.

In one embodiment, the DCT coefficients for the sampled fraction of the image may be stored in memory. Thus, these stored DCT coefficients may not need to be computed again during the entropy coding pass.

Returning to FIG. 2, in one example embodiment, the sample generator 216 may comprise a sample selector 218 and an entropy calculator 220. The sample selector 218 may select a sample that represents a small percentage portion of the entire input image. The entropy calculator 220 may calculate the entropy of the probability distribution for the selected sample. The sample selector 218 may then select a next sample that may represent a larger percentage portion of the entire input image, as compared to the previous sample. The entropy calculator 220 may calculate the entropy of the probability distribution for this next sample. At each iteration, the entropy of the probability distribution may be calculated for the current sample.

The iterative process may be completed when the calculated entropy for the consecutive samples starts to converge (e.g., if a difference between the entropy for the first sample and the entropy for the next sample is below a predetermined threshold). The sample selector 218 may then identify the resulting sample as suitably representative of the entire input image and provide the representative sample to the probability tables generator 212 for generating custom probability tables. The example operations performed by the encoder 200 to generate a representative sample of an input image may be described with reference to FIG. 4.

Figure 4:
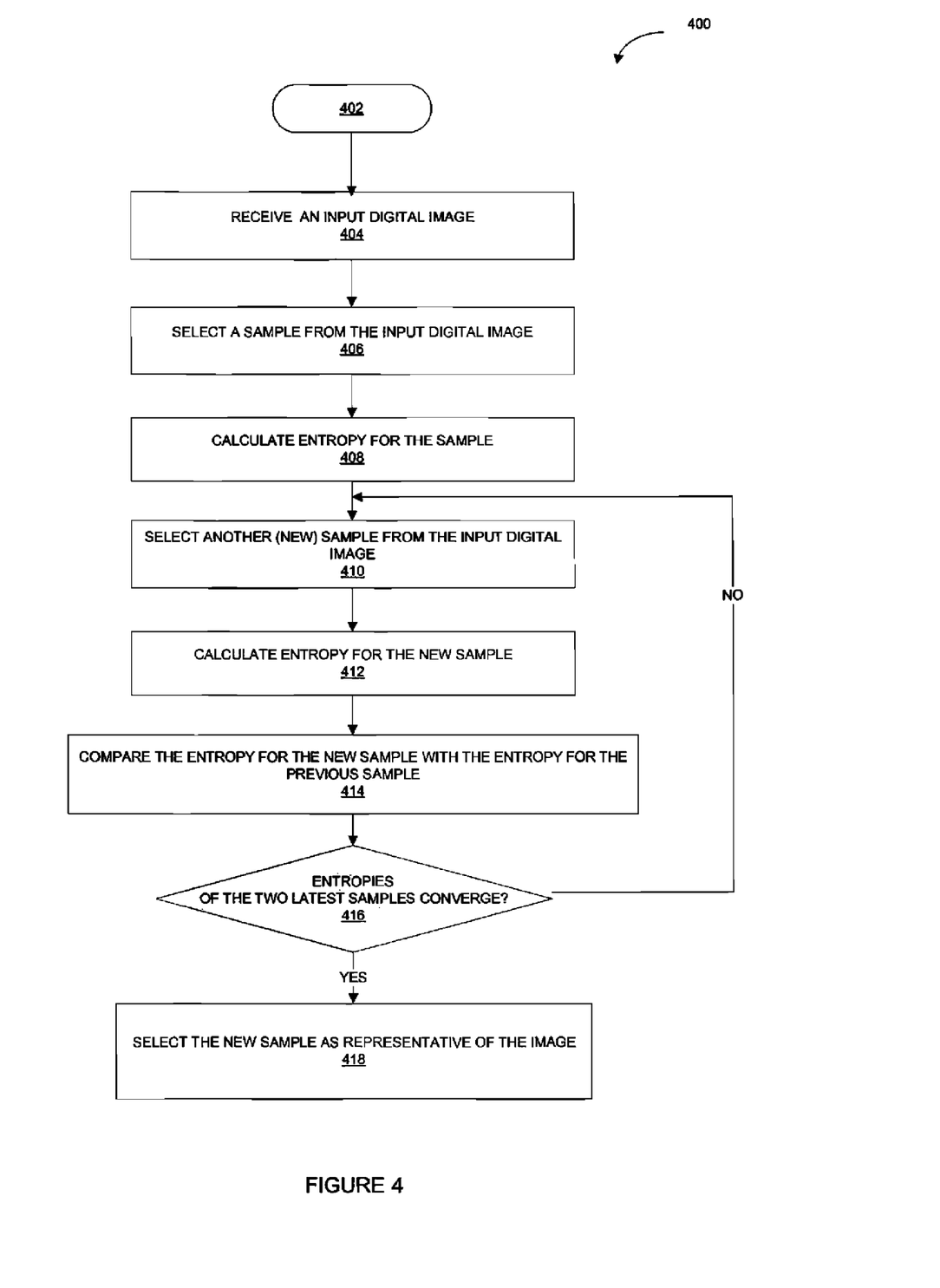
FIG. 4 a flow chart illustrating a method to generate a representative sample of an image, in accordance with an example embodiment.

FIG. 4 is a flow chart illustrating a method 400 to generate a representative sample of an image, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2 described above.

As shown in FIG. 4, the method 400 commences at operation 402. At operation 404, the sample selector 218 of the sample generator 216 selects a first sample from a digital input image and the entropy calculator 220 calculates entropy for the first sample at operation 406. Next, the sample selector 218 may select another sample from the digital input image at operation 408 and the entropy calculator 22 may calculate entropy for this new sample, at operation 410. In one example embodiment, the new sample may represent a larger percentage of the input image than the first sample.

The entropy for the first sample is compared with the entropy for the new sample at operation 412. If it is determined, at operation 414, that the entropies of these two samples converge, e.g., if the difference between the entropy for the first sample and the entropy for the new sample is less than a predetermined threshold, the sample selector 218 may identify the current sample (here, the new sample) as a representative sample of the input image. The representative sample may then be utilized by the probability tables generator 212 to generate custom probability tables for the input image. As mentioned above, the sampling process may result in a sample fragment of an input image where blocks are uniformly distributed over the entire image and thus may be utilized as a good proxy for the actual image.

The following pseudo-code describes the high level process for generating a compressed version of an input image, according to one example embodiment.

```
GenerateHuffmanTable( )
{
For each sampled block
   {
   DoDCT( );
   if(memory available)
   {
      StoreDCTCoefficients( );
   }
   CollectStatistics( );
   }
CreateAndStoreTable( );
}
main( )
{
GenerateHuffmanTable( );
WriteHuffmanTableToJPEGFile( );
For each image block
   {
   if(block is not already stored)
   {
      DoDCT( );
   }
   EncodeBlockAndWriteToFile( );
   }
}
```

The techniques described herein may be utilized in a variety of applications, including desk top applications for image processing, built-in logic for digital cameras, etc. It will be noted that, although the system and method to generate a compressed image have been described in the context of JPEG compression, the system and method may be utilized advantageously with image compression techniques that perform two passes over an image—first to gather the probability statistics and second to actually use the statistics to generate entropy codes.

In one example embodiment, the method and system described herein may be utilized with coding scheme that operates using the following steps:

1) dividing an image into blocks (the blocks may be any size, not necessarily 8×8 blocks as in JPEG);
2) optionally applying a transform (the transform is not necessarily DCT, it could be, e.g., wavelet, Hadamard, some approximation of DCT, or an identity transform, where no transform is applied); and
3) using an entropy coding method that relies on the statistics of the image being coded, which is generated in a separate pass from the coding pass.

Figure 6:
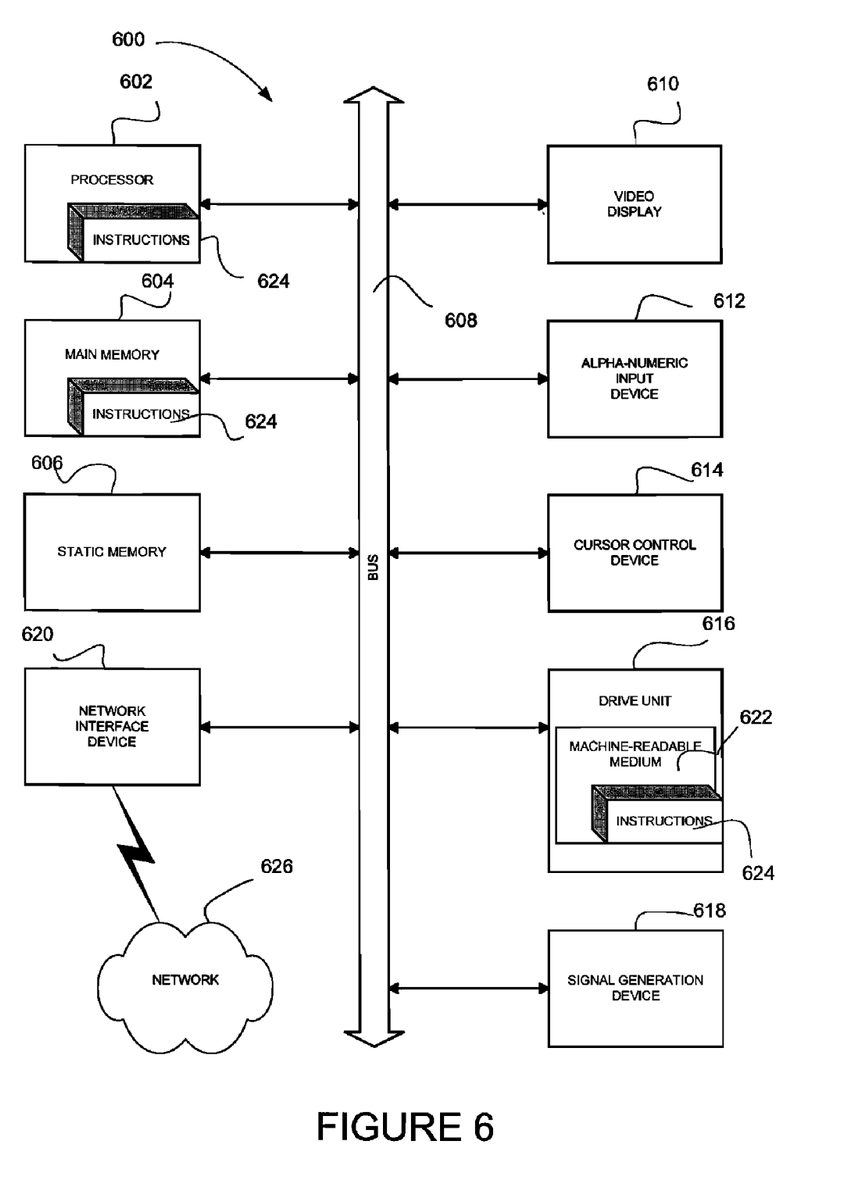
FIG. 6 illustrates a diagrammatic representation of a machine in the example form of a computer system within which a set of instructions, for causing the machine to perform any one or more of the methodologies discussed herein, may be executed.

FIG. 6 shows a diagrammatic representation of a machine in the example electronic form of a computer system 600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system for generating a compressed image have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system comprising:
   at least one processor coupled to a memory;
   an input module to receive an input image;
   an image blocks module to represent the input image as a plurality of blocks, the plurality of blocks being organized into a first number of columns and a first number of rows;
   a sample generator to generate a representative sample image from the input image based on a sampling rule, the sample generator to:
      sample each row from the first number of rows, for each row starting from a different column position and to generate a subset of the plurality of blocks, and
      identify the subset of the plurality of blocks as the representative sample image;
   a statistics generator to generate statistics of transform coefficients obtained for the representative sample image;
   a custom probability tables generator to generate, using the at least one processor, custom probability tables utilizing the representative sample image and the statistics generated for the representative sample image; and
   an entropy coder to encode the input image utilizing the custom probability tables generated based on the statistics generated for the representative sample image.

2. The system of claim 1, wherein the sample generator is to generate the representative sample image from the input image utilizing a random sampling method.

3. The system of claim 1, further comprising:
   an image blocks module to represent the input image as a plurality of blocks, the plurality of blocks being organized into a first number of columns and a first number of rows, wherein
   the sample generator is to select a block from each kth column from the first number of columns and to generate a subset of the plurality of blocks, and
   identify the subset of the plurality of blocks as the representative sample image.

4. The system of claim 1, further comprising:
   an image blocks module to represent the input image as a plurality of blocks associated with a grid, wherein
   the sample generator is to:
      select a central block from the plurality of blocks associated with the grid, and
      identify the central block as the representative sample image.

5. The system of claim 1, wherein the sample generator comprises:
a sample selector to select a first sample from the input image and a second sample from the input image;
an entropy calculator to calculate entropy for the first sample and for the second sample, the second sample representing a larger percentage of the input image, wherein
the sample generator is to identify the second sample from the input image as the representative sample image if a difference between the entropy for the first sample and the entropy for the second sample is below a predetermined threshold.

6. The system of claim 1, wherein the input image is a raw digital image.

7. The system of claim 1, wherein the input image is a compressed image, the compressed image generated utilizing pre-defined probability tables.

8. The system of claim 1, wherein the entropy coder is to utilize Huffman coding.

9. The system of claim 1, further comprising a DCT module to obtain DCT coefficients for the representative sample image and to store the obtained DCT coefficients.

10. The system of claim 9, wherein the entropy coder is to encode the input image utilizing the stored DCT coefficients.

11. A method comprising:
receiving an input image;
generating a representative sample image from the input image based on a sampling rule, the generating of the representative sample image from the input image based on a sampling rule comprises:
representing the input image as a plurality of blocks, the plurality of blocks being organized into a first number of columns and a first number of rows,
sampling each row from the first number of rows, for each row starting from a different column position to generate a subset of the plurality of blocks, and
identifying the subset of the plurality of blocks as the representative sample image;
generating statistics of transform coefficients obtained for the representative sample image;
generating custom probability tables utilizing the representative sample image and the statistics generated for the representative sample image; and
encoding the input image utilizing the custom probability tables generated based on the statistics generated for the representative sample image.

12. The method of claim 11, wherein the generating of the representative sample image comprises generating the representative sample image from the input image utilizing a random sampling method.

13. The method of claim 11, wherein the generating of the representative sample image from the input image based on a sampling rule comprises:
representing the input image as a plurality of blocks, the plurality of blocks being organized into a first number of columns and a first number of rows;
sampling each kth column from the first number of columns to generate a subset of the plurality of blocks; and
identifying the subset of plurality of blocks as the representative sample image.

14. The method of claim 11, wherein the generating of the representative sample image from the input image based on a sampling rule comprises:
representing the input image as a plurality of blocks, the plurality of blocks being associated with a grid;
selecting a central block from the plurality of blocks associated with the grid; and
identifying the central block as the representative sample image.

15. The method of claim 11, wherein the generating of the representative sample image comprises:
generating a first sample from the input image;
calculating entropy for the first sample;
generating a second sample from the input image, the second sample representing a larger percentage of the input image;
calculating entropy for the second sample; and
identifying the second sample from the input image as the representative sample image if a difference between the entropy for the first sample and the entropy for the second sample is below a predetermined threshold.

16. The method of claim 11, wherein the input image is a raw digital image.

17. The method of claim 11, wherein the input image is a compressed image, the compressed image generated utilizing pre-defined probability tables.

18. The method of claim 11, wherein the encoding of the input image comprises utilizing the custom probability tables utilizing Huffman coding.

19. The method of claim 11, further comprising obtaining DCT coefficients for the representative sample image and storing the obtained DCT coefficients.

20. The method of claim 19, wherein the encoding of the input image utilizing the custom probability tables comprises utilizing the stored DCT coefficients.

21. A machine-readable non-transitory storage medium having instruction data to cause a machine to:
receive an input image;
generate a representative sample image from the input image based on a sampling rule, the generating of the representative sample image from the input image based on a sampling rule comprises:
representing the input image as a plurality of blocks, the plurality of blocks being organized into a first number of columns and a first number of rows,
sampling each row from the first number of rows, for each row starting from a different column position to generate a subset of the plurality of blocks, and
identifying the subset of the plurality of blocks as the representative sample image;
generate custom probability tables utilizing the representative sample image and statistics generated for the representative sample image; and
encode the input image utilizing the custom probability tables generated based on the statistics generated for the representative sample image.

* * * * *

UNITED STATES PATENT AND TRADEMARK OFFICE
CERTIFICATE OF CORRECTION

| | | |
|---|---|---|
| PATENT NO. | : 8,260,070 B1 | Page 1 of 2 |
| APPLICATION NO. | : 11/543708 | |
| DATED | : September 4, 2012 | |
| INVENTOR(S) | : Rastogi et al. | |

It is certified that error appears in the above-identified patent and that said Letters Patent is hereby corrected as shown below:

On the Title page, in Item [75], in "Inventors", in column 1, line 1, delete "Nodia" and insert --Noida--, therefor On the Title page, Item [56], in column 2, under "Other Publications", line 1, delete "et al," and insert --et al.,--, therefor On the Title page, Item [56], in column 2, under "Other Publications", line 3, after "vol. 3488", insert --,--, therefor On the Title page, Item [56], in column 2, under "Other Publications", line 4, delete "et al," and insert --et al.,--, therefor On the Title page, Item [56], in column 2, under "Other Publications", line 6, after "(1998)" insert --,--, therefor On the Title page, Item [56], in column 2, under "Other Publications", line 7, delete "M. ," and insert --M.,--, therefor On the Title page, Item [56], in column 2, under "Other Publications", line 9, delete "(1995),342-351." and insert --(1995), 342-351."--, therefor On the Title page, Item [56], in column 2, under "Other Publications", line 10, delete "Rickus ," and insert --Rickus,--, therefor On the Title page, Item [56], in column 2, under "Other Publications", line 12, delete ",(2005),122 pgs." and insert --, (2005), 122 pgs.--, therefor On the Title page, Item [56], in column 2, under "Other Publications", line 13, delete "K. ," and insert --K.,--, therefor Signed and Sealed this
Twenty-seventh Day of November, 2012

David J. Kappos
*Director of the United States Patent and Trademark Office*

CERTIFICATE OF CORRECTION (continued)
U.S. Pat. No. 8,260,070 B1

On the Title page, Item [56], in column 2, under "Other Publications", line 15, delete ",1228-1237." and insert --, 1228-1237.--, therefor In column 10, line 2, in claim 13, after "of", insert --the--, therefor